(12) United States Patent
Gonthier

(10) Patent No.: US 11,808,981 B2
(45) Date of Patent: Nov. 7, 2023

(54) METHOD OF FUSION SPLICING OPTICAL FIBERS WITH LASERS

(71) Applicant: O'FIBERTY TECHNOLOGIES INC., Outremont (CA)

(72) Inventor: François Gonthier, Outremont (CA)

(73) Assignee: O'FIBERTY TECHNOLOGIES INC., Montreal (CA)

( * ) Notice: Subject to any disclaimer, the term of this patent is extended or adjusted under 35 U.S.C. 154(b) by 397 days.

(21) Appl. No.: 17/258,091

(22) PCT Filed: Jul. 4, 2019

(86) PCT No.: PCT/IB2019/055736
§ 371 (c)(1),
(2) Date: Jan. 5, 2021

(87) PCT Pub. No.: WO2020/008421
PCT Pub. Date: Jan. 9, 2020

(65) Prior Publication Data
US 2023/0124289 A1    Apr. 20, 2023

Related U.S. Application Data

(60) Provisional application No. 62/694,669, filed on Jul. 6, 2018.

(51) Int. Cl.
*G02B 6/255* (2006.01)

(52) U.S. Cl.
CPC ......... *G02B 6/2551* (2013.01); *G02B 6/2553* (2013.01)

(58) Field of Classification Search
None
See application file for complete search history.

(56) References Cited

U.S. PATENT DOCUMENTS

| | | | |
|---|---|---|---|
| 4,350,867 | A | 9/1982 | Kinoshita et al. |
| 4,954,152 | A | 9/1990 | Hsu et al. |
| 5,066,091 | A | 11/1991 | Stoy et al. |
| 5,222,171 | A | 6/1993 | Straus |
| 5,257,337 | A | 10/1993 | Grigsby et al. |

(Continued)

FOREIGN PATENT DOCUMENTS

| | | |
|---|---|---|
| CA | 2587602 | 10/2011 |
| EP | 1219987 | 7/2002 |
| GB | 2052786 | 1/1981 |

OTHER PUBLICATIONS

Written Opinion of the International Searching Authority issued by the World Intellectual Property Organization dated Dec. 13, 2019 for PCT application PCT/IB2019/055736 from which the present application claims priority.

(Continued)

*Primary Examiner* — Jerry Rahll

(57) ABSTRACT

Laser light splicing of optical fibers with laser light outside of the peak absorption band of the optical fibers, for example splicing of silica optical fibers at wavelengths smaller than about 9 μm. In some variants, the product of the absorption coefficient at ambient temperature of the optical fibers at the wavelength of the laser light with the power of the laser light is smaller than the product of the peak absorption coefficient at ambient temperature in the absorption band by the power required to splice the optical fibers with light at the peak absorption.

22 Claims, 2 Drawing Sheets

(56) References Cited

U.S. PATENT DOCUMENTS

| | | | |
|---|---|---|---|
| 6,411,759 B1 | 6/2002 | Beguin et al. | |
| 6,414,262 B1 * | 7/2002 | Rao .................... | B23K 26/043 |
| | | | 219/121.63 |
| 6,550,985 B2 | 4/2003 | Nakamura et al. | |
| 6,612,754 B2 | 9/2003 | Dahmani et al. | |
| 6,729,777 B2 | 5/2004 | Kato et al. | |
| 7,029,187 B2 | 4/2006 | Chapman et al. | |
| 7,144,165 B2 | 12/2006 | Huang et al. | |
| 7,168,864 B2 | 1/2007 | Inoue et al. | |
| 7,267,495 B2 | 9/2007 | Suzuki et al. | |
| 9,477,042 B2 | 10/2016 | Fernald et al. | |
| 2004/0165841 A1 | 8/2004 | Fernald et al. | |
| 2005/0117856 A1 | 6/2005 | Huang et al. | |
| 2005/0191014 A1 | 9/2005 | Renfro, Jr. et al. | |
| 2010/0101277 A1 | 4/2010 | Gonthier et al. | |
| 2017/0044046 A1 | 2/2017 | Miyazaki et al. | |

OTHER PUBLICATIONS

International Search Report issued by the World Intellectual Property Organization dated Dec. 13, 2019 for PCT application PCT/IB2019/055736 from which the present application claims priority.

* cited by examiner

METHOD OF FUSION SPLICING OPTICAL FIBERS WITH LASERS

FIELD OF THE INVENTION

The present invention relates to the general field of optical fibers, and is more particularly concerned with optical fiber splicing with lasers.

BACKGROUND

Optical fibers can be coupled to each other through splicing. In this process, the bare free ends of two optical fibers are abutted against each other and the abutted ends are then heated sufficiently to attach the two optical fibers to each other. The two previously separated optical fibers then form a single uninterrupted fiber.

Laser fiber splicers are relatively expensive and cumbersome devices. One type of splicer uses one or more laser. The lasers operate near an absorption peak of the optical fibers to ensure efficient heating. Unfortunately, such lasers having a sufficient power are relatively large and expensive.

Accordingly, there exists a need for novel devices and methods for laser splicing optical fibers. An object of the invention is to provide such devices and methods.

SUMMARY OF THE INVENTION

In a broad aspect, there is provided a method for splicing two optical fibers each defining a respective free end, the method comprising: providing the two optical fibers, the two optical fibers being silica optical fibers defining an absorption spectrum; aligning coaxially and abutting against each other the two free ends; and irradiating the two optical fibers at the free ends with laser light until the two optical fibers are spliced to each other. The laser light has a laser light wavelength smaller than about 9 µm.

There may also be provided a method wherein the absorption spectrum defines an absorption broad slope in an infrared region of the absorption spectrum and an absorption band at longer wavelengths adjacent to the absorption broad slope, absorption being higher in the absorption band than in the absorption broad slope, the laser light wavelength being in the absorption broad slope.

There may also be provided a method wherein the laser light has a power such that absorption of the laser light by the two optical fibers at ambient temperature is insufficient to increase a temperature of the two optical fibers sufficiently to cause splicing, the method further comprising gradually heating the two optical fibers with the laser light to shift the absorption band towards shorter wavelengths.

There may also be provided a method wherein the laser light is laser light from a Quantum Cascade Laser (QCL).

There may also be provided a method wherein the laser light is pulsed

There may also be provided a method wherein an absorption coefficient at ambient temperature of the two optical fibers at the laser light wavelength is more than 10 times smaller than a peak absorption coefficient of the two optical fibers in the absorption band at ambient temperature.

There may also be provided a method wherein a laser light power density of the laser light is less than 10 times a splicing power density required to splice the two optical fiber with absorption band laser light having a wavelength in the absorption band at ambient temperature.

There may also be provided a method wherein a laser light power density of the laser light is less than 2 times a splicing power density required to splice the two optical fiber with absorption band laser light having a wavelength in the absorption band at ambient temperature.

There may also be provided a method further comprising focusing the laser light with a focal width smaller than a diameter of the two optical fibers.

There may also be provided a method wherein the focal width is from about 20 µm to about 100 µm.

There may also be provided a method wherein a power density of the laser light at a focus thereof is from 10 MW/m$^2$ to 100 MW/m$^2$.

There may also be provided a method wherein a power density of the laser light at a focus thereof is from 30 MW/m$^2$ to 60 MW/m$^2$.

There may also be provided a method wherein the laser light is monochromatic.

There may also be provided a method wherein the two optical fiber are covered with a respective sheath at the free ends, the method further comprising stripping the sheath from the two optical fibers at the free ends before irradiating the two optical fibers.

There may also be provided a method wherein the two optical fibers have substantially similar dimensions and compositions.

There may also be provided a method wherein the two optical fibers are single core optical fibers.

There may also be provided a method wherein the laser light wavelength is between 4 µm and 5 µm.

There may also be provided a method wherein the laser light wavelength is between 4 µm and 6 µm.

There may also be provided a method wherein the laser light wavelength is between 4 µm and 7 µm.

There may also be provided a method wherein the laser light is focused to a focus diameter of from about 20 µm to about 100 µm; the laser light has an average power of between 100 and 1000 mW; the laser light has a power density at a focus thereof of from 10 MW/m$^2$ to 100 MW/m$^2$; and the laser light wavelength is between 4 µm and 7 µm.

There may also be provided a method wherein the laser light is focused to a focus diameter of from about 30 µm to about 50 µm; the laser light has an average power of between 300 and 600 mW; the laser light has a power density at a focus thereof of from 30 MW/m$^2$ to 60 MW/m$^2$; and the laser light wavelength is between 4 µm and 5 µm.

There may also be provided a method wherein the method is performed at room temperature.

There may also be provided a method wherein the optical fibers have an absorption index of 0.05 or less at the laser light wavelength.

There may also be provided a method wherein the optical fibers have an absorption index of 0.02 or less at the laser light wavelength.

There may also be provided a method wherein the optical fibers have an absorption index of 0.01 or less at the laser light wavelength.

There may also be provided a method wherein the absorption spectrum defines an absorption peak at a wavelength longer than the laser light wavelength, a first product of an absorption coefficient of the two optical fibers at ambient temperature at the laser light wavelength multiplied by a power of the laser light being smaller than a second product of a peak absorption coefficient in the absorption band at ambient temperature multiplied by a splicing power required to splice the optical fibers with light at peak absorption in the absorption band.

There may also be provided a method wherein the first product is at least two times smaller than the second product.

There may also be provided a method wherein the first product is at least ten times smaller than the second product.

There may also be provided a method wherein the first product is at least fifty times smaller than the second product.

In another broad aspect, there is provided a method for splicing two optical fibers each defining a respective free end, the two optical fibers having an absorption band, the method comprising: aligning coaxially and abutting against each other the two free ends; and irradiating the two optical fibers at the free ends with laser light until the optical fibers are spliced to each other. The laser light has a laser light wavelength outside of the absorption band of the optical fibers. This method may also include the various specific details mentioned hereinabove with respect to the method of the first paragraph of this section.

In yet another broad aspect, there is provided a method for heating a silica optical fiber, the method comprising irradiating the optical fiber having a laser light wavelength outside of an absorption band of silica contained in the optical and shifting the absorption band towards the laser light wavelength. This method may also include the various specific details mentioned hereinabove with respect to the method of the first paragraph of this section.

It was discovered that, surprisingly, optical fibers can be spliced or melted using lasers outside of the absorption band of optical fibers at powers much lower than the absorption coefficient at the wavelength used would suggest. This opens the door to using relatively small and inexpensive lasers to splice optical fibers.

The present application claims benefit from U.S. provisional patent application 62/694,669 filed Jul. 6, 2018, the contents of which is hereby incorporated by reference in its entirety.

Other objects, advantages and features of the present invention will become more apparent upon reading of the following non-restrictive description of preferred embodiments thereof, given by way of example only with reference to the accompanying drawings.

DETAILED DESCRIPTION

In the present document, relative terminology such as "substantially" and "about" is used to denote variations in the thus qualified terms that have no significant effect on the principle of operation of the proposed splicing method. These variations are to be seen with the eye of the reader skilled in the art.

Figure 1:
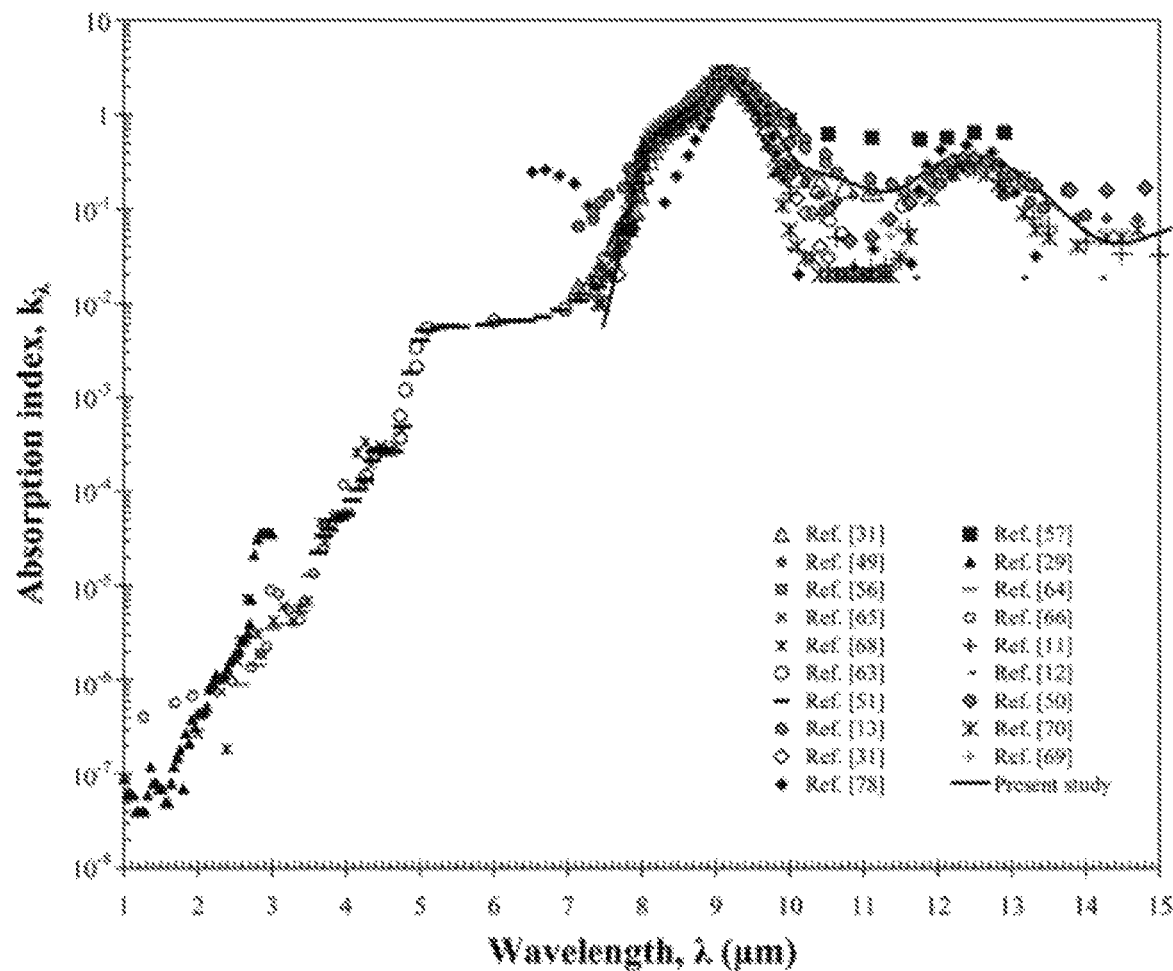
FIG. 1, in an X-Y graph, illustrates the absorption spectrum of fused silica. The graph corresponds to the imaginary part of the refractive index, k. The absorption coefficient $\alpha$ corresponds to $\alpha=(4\pi/\lambda)*k$, where $\lambda$ is the wavelength.

FIG. 1 illustrates the absorption spectrum of fused silica, the base material used in many types of optical fibers. Light is strongly absorbed at a wavelength of around 9.5 µm, for example between 9 µm and up. Going towards shorter wavelengths, absorption quickly diminishes to hit a broad slope from about 5 µm to 7 µm, and then decline sharply. In the broad slope, absorption varies much slower as a function of wavelength than in an absorption band located at longer wavelengths. Since the scale of FIG. 1 is logarithmic, this decline is extremely sharp. For example, the absorption coefficient at 4.6 µm is about 29 to 434 times smaller than at 10.6 µm, depending on the exact glass used, and 10.6 µm is not even at the absorption peak. Accordingly, one would expect that heat deposited in the material at 4.6 µm would be about 29 to 434 times smaller than at 10.6 µm at the same power, or that, conversely, one would need about 29 to 434 times more power to heat the material at 4.6 µm than at 10.6 µm. Surprisingly, as detailed in the examples below, that is not the case and sufficient heat to melt or splice optical fibers can be deposited at 4.6 µm using much less than twice the power required to do the same at 10.6 µm. Without being bound to any theoretical interpretation, it is believed that previously unknown non-linear effects in fused silica are at play that provide a positive feedback so that a small increase in temperature in the optical fibers leads to an increase in absorption coefficient, which in turn lead to an increase in temperature. However, other mechanisms could be at play.

This surprising result suggests a method for splicing optical fibers that uses laser light well outside of the peak infrared absorption band of the optical fibers to heat and splice the optical fibers. An absorption band is a region of the absorption spectrum in which light is absorbed to a much greater extent than in adjacent regions of the absorption spectrum. This band may be narrow or relatively wide. A broad slope is a region of the absorption spectrum in which there is absorption, but in which the absorption varies relatively slowly as a function of wavelength. In the case of fused silica, an absorption band of interest is close to around 9.5 µm. The absorption spectrum may be temperature dependent, and for example, reference may be made to the absorption spectrum at ambient temperature. Ambient temperature is in some embodiments around 22° C., for example between 18° C. and 25° C., referred to as room temperature. Ambient temperature is also in some embodiments the temperature of the optical fiber before laser light irradiation starts. Typically, the optical fibers are at ambient temperature before irradiation with the laser light starts.

For example, the laser light used has a wavelength smaller, than 9 µm, for example between 4 and 5, between 4 and 6 µm or between 4 and 7 µm. For example, the laser light used has a wavelength such that the absorption coefficient of the laser light is between 10 and 1000 times smaller than the peak absorption in an adjacent absorption band. The adjacent absorption band may be at a wavelength larger than the wavelength of the laser light used in the proposed method. In some embodiments, the laser light is produced by a Quantum Cascade Laser (QCL), a semiconductor laser that can be manufactured at relatively low cost. Semiconductor lasers are also much smaller than other lasers, such as $CO_2$ lasers that would emit light at a wavelength close to the absorption peak of silica, and would therefore be thought of being particularly well suited for splicing optical fibers.

Figure 2A:
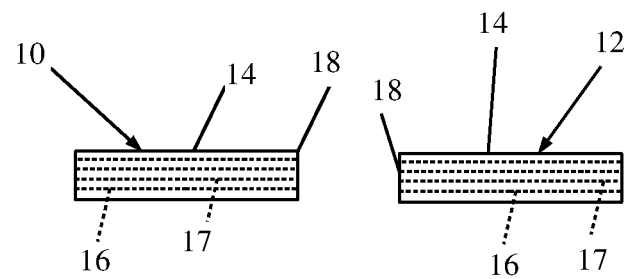
FIGS. 2A to 2D, in schematic view, illustrate a method for splicing optical fibers in accordance with an embodiment of the present invention.

More specifically, referring to FIG. 2A, there is provided a method for splicing two optical fibers 10 and 12. Each optical fiber 10 and 12 has a respective sheath and/or coating 14, which is referred to herein as the coating 14, a cladding 16 enclosed in the coating 14 and a core 17 at the center of the cladding 16. For example, and non-limitingly, the optical fibers 10 and 12 are single mode fibers. Each of the optical fibers 10 and 12 defines a free end 18. The optical fibers 10 and 12 have an absorption band, in other words a region of the spectrum in which light is absorbed to a much greater extent than in adjacent regions of the spectrum. Typically, the two optical fibers 10 and 12 are of the same type, and have similar or identical dimensions and are made of similar or identical materials. However, in some embodiments, different types of fibers or fibers having different dimensions may be spliced using the proposed method. It should be noted that for simplicity, a single core fiber has been represented. However, the present invention is also usable for other types of more specialized fibers, such as, non-limitingly, multicore fibers.

Initially, the two optical fibers 10 and 12 are separated at their free ends 18. The goal of the method is to attach the free ends 18 so that light can be transmitted between the optical fibers 10 and 12 with minimal loss. It will be presumed that the optical fibers 10 and 12 have properly shaped end faces at the free ends 18. If that is not the case, a suitable conventional cleaving step can be added to the proposed method at any suitable stage.

Figure 2B:
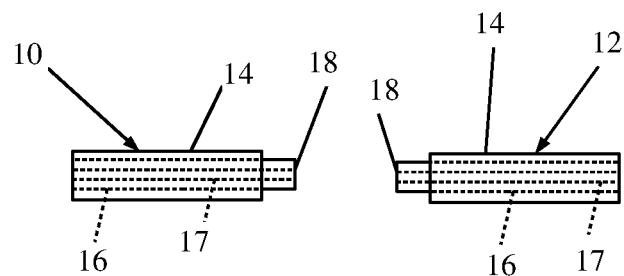

Referring to FIG. 2B, in a first step, the optical fibers 10 and 12 are stripped at the free ends 18. This step removes a small portion of the coating 14 to allow access to the cladding 16 from a direction that is not coaxial with the cladding 16. If needed, the optical fibers 10 and 12 can also be cleaned at their free ends 18 at this stage.

Figure 2C:
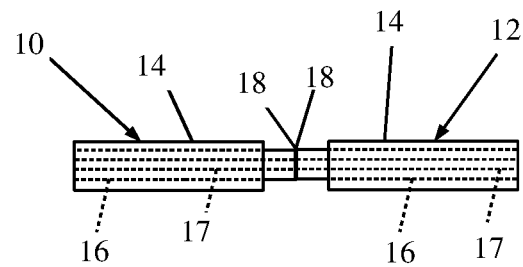

Then, as seen in FIG. 2C, the optical fibers 10 and 12 are aligned coaxially and abutted against each other at the two free ends 18. Up to this step, the method may be performed conventionally.

Figure 2D:
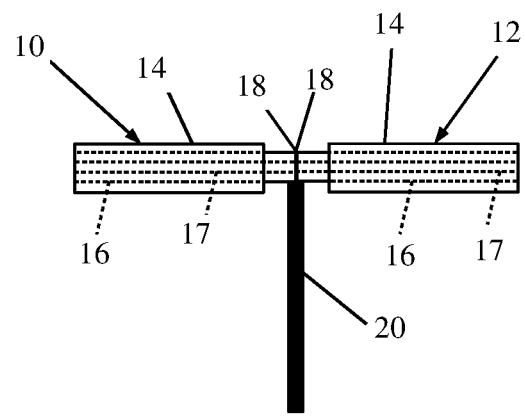

Finally, as seen in FIG. 2D, the free ends 18 are irradiated at their junction with laser light 20. The laser light 20 is outside of the absorption band of the optical fibers 10 and 12. The free ends 18 are irradiated until the optical fibers 10 and 12 are spliced, but for a duration short enough that the optical fibers 10 and 12 are not deformed too much. The laser light 20 may be focused in the optical fibers 10 and 12.

In some embodiments, the laser light 20 is focused so that the width of the focus is smaller than the width of the optical fibers 10 and 12. Once again, this is counter-intuitive as typically, when splicing, one would want to heat the whole optical fibers 10 and 12 substantially uniformly. For example, the focus diameter is about 10 to about 50 percent of the cladding diameter.

In other embodiments, the laser light is pulsed, for example with a duty cycle of between 1% to 50%. This is once again counter-intuitive as the optical fibers 10 and 12 would cool between the pulses so that at equal average power, heating would be less efficient while pulsing than with continuous irradiation. However, QCL lasers can provide large peak power if allowed to cool sufficiently between pulses, so that with the same laser, one can have either a moderate average power, or very large peaks followed by cooldown periods. In the present invention, since non-linear effects are believed to be in play, the large peak are believed to lead to an increase in heating efficiency, which allows using lasers rated for a smaller average power, which are notably cheaper. Indeed, with semiconductor lasers, cost typically increases non-linearly with average power.

In some embodiments, a few lasers are used instead of a single one. Due to the above-noted non-linear costs, this can also be advantageous. In such embodiments, to take advantage of the above-hypothesized non-linear effects, the multiple lasers may be positioned to irradiate from a relatively small angular distribution, as opposed to a more intuitive symmetrical distribution around the optical fibers 10 and 12.

In some embodiments, two lasers having different wavelengths are used to irradiate the free ends 18. Since more powerful QCL lasers can be manufactured at shorter wavelengths, a relatively powerful laser at a shorter wavelength is used in combination with a less powerful laser at a longer wavelength. For example, one of the lasers has a wavelength of about 4 μm and the other one has a wavelength of about 6 μm.

In some embodiments of the invention, the laser used in the above-referenced method has any or any combination of the following characteristics: a focus diameter of about 20 μm to about 100 μm, an average power of between 100 and 1000 mW, a power density at the focus of between 10 MW/m$^2$ to 100 MW/m$^2$, a wavelength of between 4 μm and 7 μm. In some specific embodiments of the invention, the laser used in the above-referenced method has any or any combination of the following characteristics: a focus diameter of about 30 μm to about 50 μm, an average power of between 300 mW and 600 mW, a power density at the focus of between 30 MW/m$^2$ to 60 MW/m$^2$, a wavelength of between 4 μm and 5 μm. Other suitable parameters may be used in alternative embodiments.

In some embodiments, the proposed splicing method is embodied in a miniature splicer, which may be for example hand held. This splicer may include for example a relatively large metallic body. Such a body is useful in many respects as it may act as a radiator for the laser and facilitate cooling of the optical fibers 10 and 12 after splicing is completed.

Example

To assess heating of optical fibers with different lasers, the following experiments were performed. An optical fiber was stripped and the optical fiber was irradiated under various conditions at a fixed distance from the free end. If a critical temperature is reached, the optical fiber will start to melt and the free end will then bend under the action of gravity. By measuring this bending, for example by imaging the deflection of light propagated in the optical fiber, one can determine a threshold power required at a specific wavelength to melt to optical fiber. In the present experiment, achieving in 1000 ms a deflection of 1 mm of the light exiting from an optical fiber heated at a location 5 mm away from its tip was considered as achieving the power threshold. Although not detailed, it is presumed that all components of the setup are suitably aligned so that the laser used has its focus inside the optical fiber.

Two different plano-convex lenses were used: one with a focal-length f=50 mm and one with a focal-length f=20 mm. The beam diameter before the lens was measured to be ~5230 microns for the 10.6 μm laser. At 10.6 microns, the theoretical beam diameter of the corresponding focused gaussian beam is roughly 130 microns for a f=50 mm lens and 52 microns for a f=20 mm lens. Once the lens is positioned at the focal-point relative to the optical fiber, the power can be varied to determine the threshold power for fiber fusion. Two measurement series showed repeatability of the results. It was determined that a threshold CO2 laser power of ~450 mW is required to melt an SMF28 fiber with a f=50 mm lens at 10.6 μm. This corresponds to a threshold intensity of ~3.4×10$^7$ W/m$^2$.

Another important point was revealed by examining fiber fusion videos. The fiber segment did not just go down by the action of gravity, it also bent sideways, which implies that greater melting occurs on the input surface of the fiber. This qualitatively indicates that absorption is near the surface instead of in the full volume, which means that the approximate absorption length is smaller that 40 microns. Repeating the same procedures with the f=20 mm lens resulted in a threshold power of ~340 mW required to melt an SMF28 fiber with a f=20 mm lens.

These experiments were repeated with a 4.6 µm QCL laser. Once the lens is positioned at the focal-point relative to the optical fiber, the power can be varied to determine the threshold power for fiber fusion. Contrary to the behaviour expected from absorption estimates obtained using FIG. 1, not only is the QCL able to melt the fiber but a threshold QCL power of ~550 mW is required to melt an SMF28 fiber with a f=50 mm lens. This result is very surprising. According to the above mentioned estimates of the absorption coefficient, the absorption at 4.6 µm should be roughly 434× lower than at 10.6 µm. Although Fresnel reflection losses at 4.6 microns should be ~4× lower than at 10.6 microns, one would still expect a QCL power threshold roughly 100× larger than the CO2 laser power threshold (for the same spot size).

The fact that the observed QCL threshold power is merely 22% larger than the CO2 laser power threshold implies that the absorption is far different from the ambient temperature linear absorption curve presented in FIG. 1. Furthermore, if the theoretical focal-point spot size of 42 microns is considered, the QCL threshold power corresponds to a threshold intensity of ~40×10$^7$ W/m$^2$. This is roughly a factor of 10× larger than the threshold intensity measured at 10.6 microns, instead of the expected 100× factor.

In summary, a threshold power of 450 mW and 340 mW was required at 10.6 microns in order to melt an SMF28 fiber using an f=50 mm and f=20 mm lens, respectively. A 850 mW 4.6 micron QCL was sufficiently powerful to melt the SMF28 fiber with a threshold power of 550 mW and 680 mW required at 4.6 microns in order to melt the SMF28 fiber using an f=50 mm and f=20 mm lens. Although not detailed above, it was also observed that a 105/125 multimode fiber and a 5/125 single mode fiber melted at a similar threshold power (~530 mW) as for the SMF28 fiber.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole.

What is claimed is:

1. A method for splicing two optical fibers each defining a respective free end, the method comprising:
   providing the two optical fibers, the two optical fibers being silica optical fibers defining an absorption spectrum;
   aligning coaxially and abutting against each other the two free ends; and
   irradiating the two optical fibers at the free ends with laser light until the two optical fibers are spliced to each other;
   wherein the laser light has a laser light wavelength smaller than about 9 µm;
   further wherein the laser light is laser light from a Quantum Cascade Laser (QCL).

2. The method as defined in claim 1, wherein the absorption spectrum defines an absorption peak at a wavelength longer than the laser light wavelength, a first product of an absorption coefficient of the two optical fibers at ambient temperature at the laser light wavelength multiplied by a power of the laser light being smaller than a second product of a peak absorption coefficient in the absorption band at ambient temperature multiplied by a splicing power required to splice the optical fibers with light at peak absorption in the absorption band.

3. The method as defined in claim 2, wherein the first product is at least ten times smaller than the second product.

4. The method as defined in claim 1, wherein the absorption spectrum defines an absorption broad slope in an infrared region of the absorption spectrum and an absorption band at longer wavelengths adjacent to the absorption broad slope, absorption being higher in the absorption band than in the absorption broad slope, the laser light wavelength being in the absorption broad slope.

5. The method as defined in claim 4, wherein the laser light has a power such that absorption of the laser light by the two optical fibers at ambient temperature is insufficient to increase a temperature of the two optical fibers sufficiently to cause splicing, the method further comprising gradually heating the two optical fibers with the laser light to shift the absorption band towards shorter wavelengths.

6. The method as defined in claim 4, wherein an absorption coefficient at ambient temperature of the two optical fibers at the laser light wavelength is more than 10 times smaller than a peak absorption coefficient of the two optical fibers in the absorption band at ambient temperature.

7. The method as defined in claim 6, wherein a laser light power density of the laser light is less than 10 times a splicing power density required to splice the two optical fiber with absorption band laser light having a wavelength in the absorption band at ambient temperature.

8. The method as defined in claim 6, wherein a laser light power density of the laser light is less than 2 times a splicing power density required to splice the two optical fiber with absorption band laser light having a wavelength in the absorption band at ambient temperature.

9. The method as defined in claim 1, further comprising focusing the laser light with a focal width smaller than a diameter of the two optical fibers.

10. The method as defined in claim 9, wherein the focal width is from about 20 µm to about 100 µm_and a power density of the laser light at a focus thereof is from 10 MW/m$^2$ to 100 MW/m$^2$.

11. The method as defined in claim 1, wherein the laser light is pulsed.

12. The method as defined in claim 1, wherein the laser light is a first laser light, the method further comprising irradiating at least one of the two optical fibers with a second laser light, the first and second laser lights having respectively first and second wavelengths and first and second powers, the second wavelength being larger than the first wavelength and smaller than 9 µm, the second power being smaller than the first power.

13. The method as defined in claim 1, wherein the laser light is monochromatic.

14. The method as defined in claim 1, wherein the two optical fiber are covered with a respective sheath at the free ends, the method further comprising stripping the sheath from the two optical fibers at the free ends before irradiating the two optical fibers.

15. The method as defined in claim 1, wherein the two optical fibers have substantially similar dimensions and compositions and wherein the two optical fibers are single core optical fibers.

16. The method as defined in claim 1, wherein the two optical fibers have an absorption index of 0.02 or less at the laser light wavelength.

17. The method as defined in claim 1, wherein the laser light wavelength is between 4 μm and 5 μm.

18. The method as defined in claim 1, wherein the method is performed at room temperature.

19. The method as defined in claim 1, wherein
the laser light is focused to a focus diameter of from about 30 μm to about 50 μm;
the laser light has an average power of between 300 and 600 mW;
the laser light has a power density at a focus thereof of from 30 MW/m$^2$ to 60 MW/m$^2$; and
the laser light wavelength is between 4 μm and 5 μm.

20. The method as defined in claim 1, wherein
the laser light is focused to a focus diameter of from about 20 μm to about 100 μm;
the laser light has an average power of between 100 and 1000 mW;
the laser light has a power density at a focus thereof of from 10 MW/m$^2$ to 100 MW/m$^2$; and
the laser light wavelength is between 4 μm and 7 μm.

21. A method for splicing two optical fibers each defining a respective free end, the method comprising:
providing the two optical fibers, the two optical fibers being silica optical fibers defining an absorption spectrum;
aligning coaxially and abutting against each other the two free ends; and
irradiating the two optical fibers at the free ends with laser light until the two optical fibers are spliced to each other;
wherein the laser light has a laser light wavelength smaller than about 9 μm;
further wherein the laser light has a power such that absorption of the laser light by the two optical fibers at ambient temperature is insufficient to increase a temperature of the two optical fibers sufficiently to cause splicing, the method further comprising gradually heating the two optical fibers with the laser light to shift the absorption band towards shorter wavelengths.

22. A method for splicing two optical fibers each defining a respective free end, the method comprising:
providing the two optical fibers, the two optical fibers being silica optical fibers defining an absorption spectrum;
aligning coaxially and abutting against each other the two free ends; and
irradiating the two optical fibers at the free ends with laser light until the two optical fibers are spliced to each other;
wherein
the laser light is focused to a focus diameter of from about 20 μm to about 100 μm;
the laser light has an average power of between 100 and 1000 mW;
the laser light has a power density at a focus thereof of from 10 MW/m$^2$ to 100 MW/m$^2$; and
the laser light wavelength is between 4 μm and 7 μm.

* * * * *